Oct. 4, 1938.  W. E. FROELIGER  2,132,104
VEHICLE WINDOW SILENCER
Filed July 15, 1937
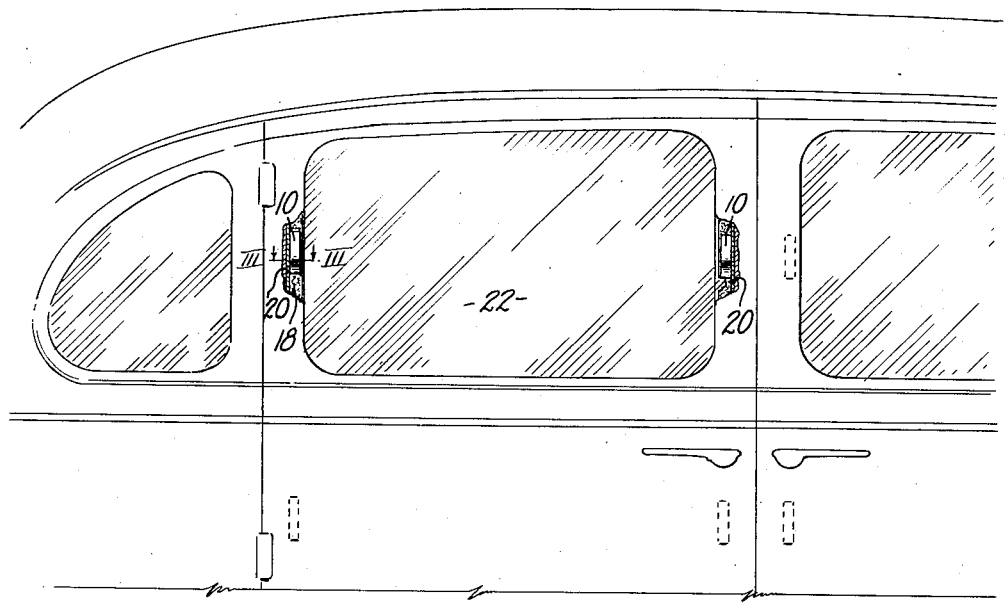
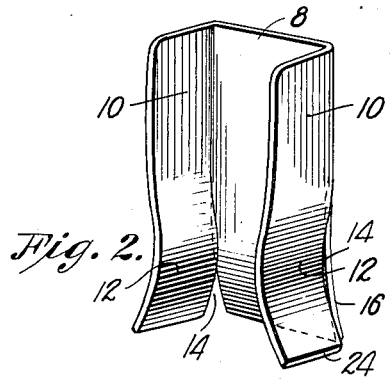
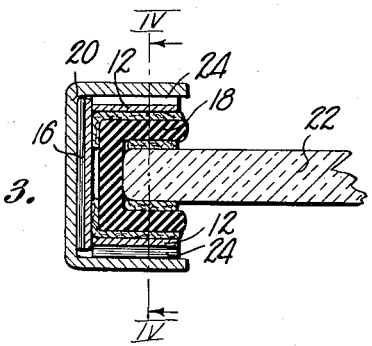
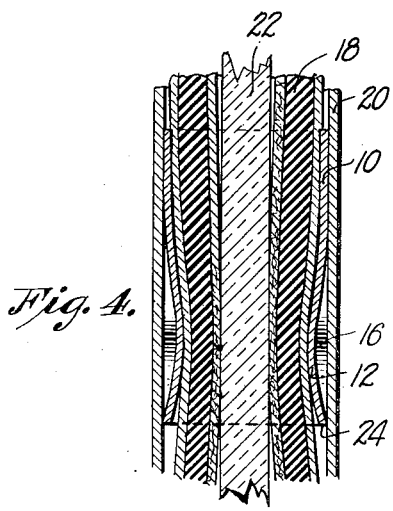
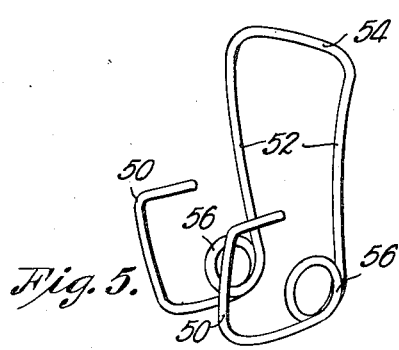
INVENTOR.
William E. Froeliger
BY
ATTORNEYS

Patented Oct. 4, 1938

2,132,104

UNITED STATES PATENT OFFICE 2,132,104

VEHICLE WINDOW SILENCER

William E. Froeliger, Lawrence, Kans.

Application July 15, 1937, Serial No. 153,764

8 Claims. (Cl. 296—44.5)

This invention relates to a new article of manufacture in the nature of a vehicle window silencer that may be combined with the conventional automobile window casing in a manner as to effectively preclude objectionable displacement of the window glass which usually creates an undesirable noise during the operation of the vehicle.

The primary object of the invention is to provide a novel, unique and long-lasting window silencer which has a substantially U-shaped body formed to exert inward pressure upon the sides of the window glass guide and a similar pressure upon the back of the said guide so that the standard flexible guide may be made to effectively hold the window glass against "play" after the original tight fit has disappeared.

A further aim of this invention is the provision of a vehicle window silencer that may be quickly positioned without the aid of special tools; will serve to hold itself in the operative position without displacement; will utilize the conventional window glass guide as a part of the window assembly as the life of said guide becomes spent through use; and will be inexpensive to produce.

Other objects of the invention will appear during the course of the following specification, referring to the accompanying drawing, wherein:

Figure 1 is a fragmentary, side elevation of an automobile equipped with window silencers made in accordance with the present invention.

Fig. 2 is an enlarged, perspective view of one of the vehicle window silencers, showing the same entirely removed from the operative or assembled position.

Fig. 3 is an enlarged, fragmentary, cross sectional view through a portion of a vehicle window casing, with the silencer in place, taken on line III—III of Fig. 1.

Fig. 4 is a fragmentary, longitudinal, sectional view, taken on line IV—IV of Fig. 3, and, Fig. 5 is a perspective view of a vehicle window silencer made to embody a modified form of the invention.

It is well known in the art that automobile windows move in specially constructed shock-absorbing guides and that after prolonged use, the window glass becomes loose enough to create highly objectionable noises as the vehicle is operated. This shortcoming which is developed, may be overcome by replacing the lifeless and shrunken window glass guides, but the expense incident thereto is prohibitive. The placement of silencer clips of the nature embodying the concepts of this invention at spaced-apart points along the length of the window glass guide will effectively hold the said glass against displacement and therefore, obviate the necessity of renewing the aforesaid guides.

The preferred form of the invention is illustrated in Figs. 1 to 4 inclusive of the drawing, and the clip per se is a relatively short, U-shaped body, provided with a bight 8 and opposed, laterally extending legs 10, each of which has an inwardly arched portion 12 made free to flex because of slits 14 that are formed inwardly from one end of the U-shaped body along the lines of meeting of bight 8 and legs 10. The back wall of bight 8 is arched outwardly as at 16 for the hereinafter mentioned purpose. The distance between legs 10 is about the same as the outside width of window glass guide 18, but the distance between the proximal areas of inwardly arched portions 12 is less than the outside width of guide 18. Arched portion 16 of bight 8 rests against the bottom wall of window glass guide channel member 20 and, therefore, presses the bottom of guide 18 inwardly against the edge of window glass 22. The force exerted by arched portion 16 upon window glass guide 18 is along a line perpendicular to the pressure exerted against said guide by legs 10, and therefore, the zone of contact between guide 18 and each clip will be a zone of pressure against the glass. The resiliency of the metal from which the silencer clip is constructed is slight, but combines with the resiliency inherent in guide 18 to such an extent that glass 22 will fit snugly, yet be allowed to slide to and from the window closing position.

The portions of legs 10 on each side of arch 12 contact the inner faces of guide channel 20, and the frictional engagement, therefore, will be effective in stopping any tendency on the part of the clip to move along guide 18 and channel 20. As a matter of fact, the free edge 24 of each leg 10 will tend to bight into the inner face of channel 20 and jolting or the action of gravity will be definitely overcome by the grip that is established between these edges 24 and channel 20.

Arched portions 12 extend inwardly over bight 8, as illustrated in Fig. 2, and while the portions of legs 10 that are continuations of bight 8 remain tightly against the sides of guide 18, arched portions 12 thereof are free to progressively compress guide 18 as it diminishes in size as a result of use. The clip embraces guide 18 and lies between that guide and channel 20, when in the operative position.

The form of clip shown in Fig. 5 is somewhat different in specific nature than the one just specified, but its function is substantially the same in that opposed legs 50 press against the sides of guide 18, while the arched portions 52 of yoke 54 press inwardly against the back of guide 18. The zone of connection between yoke 54 and legs 50 is created by coils 56 that contribute to the resiliency and adjustability of the clip when it is formed of wire. The position of this type silencer is the same as the position of the one previously described, and it is as effective in silencing an otherwise noisy window glass as the form shown in Fig. 2.

Any number of clips might be employed along the length of any given window glass guide 18, and the number, obviously, is contingent upon the condition of the structure being treated.

It is conceivable that silencer clips having physical embodiments different than those illustrated might be made without departing from the spirit of the invention or scope of the appended claims.

Having thus described the invention, what is claimed as new and desired to be secured by Letters Patent is:

1. In an automobile body having a grooved window casing and a flexible window glass guide channel positioned therein, the combination of a silencer clip comprising a relatively short, U-shaped body embracing the said channel, positioned within the groove of the window casing and formed to exert inward pressure against the guide channel at opposed points on the sides thereof said body having outwardly directed edges at one end thereof and along three sides of the guide groove for engaging the window casing.

2. In an automobile body having a grooved window casing and a flexible window glass guide channel positioned therein, the combination of a silencer clip comprising a relatively short, U-shaped body, providing legs and a bight, embracing the said channel, positioned within the groove of the window casing, said legs of the body being arched inwardly along opposed portions thereof to force the sides of the flexible guide against the window glass when the clip is in the operative position said legs each having an outwardly directed end in engagement with the inner face of the window casing within said groove for the purpose specified.

3. In an automobile body having a grooved window casing and a flexible window glass guide channel positioned therein, the combination of a silencer clip comprising a relatively short, U-shaped body, providing legs and a bight, embracing the said channel, positioned within the groove of the window casing, said legs of the body being arched inwardly along opposed portions thereof to force the sides of the flexible guide against the window glass when the clip is in the operative position, the portions of the legs on each side of the arches thereof being in engagement with the inner face of said grooved window casing said bight having an outwardly directed edge in engagement with the window casing within the groove thereof.

4. In an automobile body having a grooved window casing and a flexible window glass guide channel positioned therein, the combination of a silencer clip comprising a relatively short, U-shaped body, providing legs and a bight, embracing the said channel, positioned within the groove of the window casing, said legs of the body being arched inwardly along opposed portions thereof to force the sides of the flexible guide against the window glass when the clip is in the operative position, the portions of the legs on each side of the arches thereof being in engagement with the inner face of said grooved window casing, said U-shaped body being provided with a pair of slits extending inwardly from one end of the body along the lines of juncture between the legs and bight to allow greater freedom of movement of the legs toward and from each other along the lengths thereof coextensive with said slits.

5. In an automobile body having a grooved window casing and a flexible window glass guide channel positioned therein, the combination of a silencer clip comprising a relatively short U-shaped body, providing legs and a bight, embracing the said channel, positioned within the groove of the window casing, said legs of the body being arched inwardly along opposed portions thereof to force the sides of the flexible guide against the window glass when the clip is in the operative position, the portions of the legs on each side of the arches thereof being in engagement with the inner face of said grooved window casing, said U-shaped body being provided with a pair of slits extending inwardly from one end of the body along the lines of juncture between the legs and bight to allow greater freedom of movement of the legs toward and from each other along the lengths thereof coextensive with said slits, the bight of said U-shaped body being arched outwardly at the length thereof between said slits whereby to exert a pressure against said flexible guide at right angles to the pressure exerted thereagainst by said legs.

6. In an automobile body having a grooved window casing and a flexible window glass guide channel positioned therein, the combination of a silencer clip comprising a relatively short body; opposed legs on the body formed to exert inward pressure against the sides of the guide channel; and an arched wall between and to one side of the legs for exerting inward pressure against the back of the guide channel, a portion of said legs overlying the said arched wall.

7. As a new article of manufacture, a clip for use as a silencer for vehicle window glass, comprising a channel-shaped body having a pair of legs and a connecting wall, said body being provided with slits extending inwardly for a portion of its length from one end thereof along the line of connection between each leg respectively and said wall to provide a freely movable end portion on the legs.

8. As a new article of manufacture, a clip for use as a silencer for vehicle window glass, comprising a channel-shaped body having a pair of legs and a connecting wall, said body being provided with slits extending inwardly for a portion of its length from one end thereof along the line of connection between each leg respectively and said wall to provide a detached end portion on the legs, said legs and said wall being longitudinally arched along the lengths thereof between the free ends thereof and the ends of said slits.

WILLIAM E. FROELIGER.